Feb. 20, 1951 — W. J. MacLELLAN — 2,542,040

MULTIPLE LEG SUPPORT MEANS

Filed May 15, 1946 — 2 Sheets-Sheet 1

INVENTOR
William Joseph MacLellan
BY
Fred C. Matheny
ATTORNEY

Feb. 20, 1951 W. J. MacLELLAN 2,542,040
MULTIPLE LEG SUPPORT MEANS
Filed May 15, 1946 2 Sheets-Sheet 2

INVENTOR
William Joseph MacLellan
BY
Fred C. Matheny
ATTORNEY

Patented Feb. 20, 1951

2,542,040

UNITED STATES PATENT OFFICE 2,542,040

MULTIPLE LEG SUPPORT MEANS

William Joseph MacLellan, Seattle, Wash.

Application May 15, 1946, Serial No. 670,010

2 Claims. (Cl. 155—136)

This invention relates to a multiple leg load supporting means of a type well adapted to be used as leg structure for furniture but which may be used for other purposes.

An object of this invention is to provide simple and efficient means for pivotally connecting together three or more leg members so as to provide a highly efficient load supporting structure that is capable of being folded.

Another object of this invention is to provide a load supporting means comprising a spider having a plurality of outwardly extending arms and plurality of leg members pivotally mounted on said arms and movable between a folded position and an extended or load supporting position.

Another object is to provide multiple leg load supporting means in which the legs are crossed when in load supporting position and in which said legs are all pivotally interconnected at the location where they are crossed by a spider member of a strong, simple and highly efficient form of construction.

Other objects of this invention will be apparent from the following description taken in connection with the accompanying drawings.

In the drawings.

Like reference numerals designate like parts throughout the several views.

Figs. 1 to 4 of the drawings show this invention as embodied in a cane stool. Fig. 19 shows the same as applied to a table. Figs. 5 to 18 show structural details. Obviously this invention can be applied to many articles beside stools and tables. The cane stool shown in Figs. 1 to 4 comprises a combined cane and leg member 20, and a seat 23. Preferably the member 20 has a hand hold portion 24 at its upper end.

Figure 5:
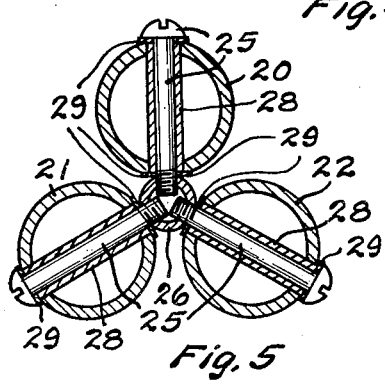
Fig. 5 is a sectional view on a larger scale than the preceding figures showing the spider means with the supporting legs pivotally mounted thereon.
Figures 6, 7:
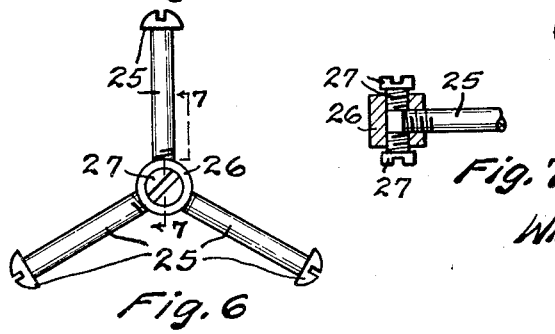
Fig. 6 is a detached plan view of the spider shown in Fig. 5.
Fig. 7 is a fragmentary sectional view of the hub portion of said spider, taken substantially on broken line 7—7 of Fig. 6.

The two leg members 21 and 22 and the cane and leg member 20 are each pivotally mounted on one of the arms 25 of a three pronged spider member such as the spider member shown in Figs. 5, 6 and 7. One satisfactory way of constructing this spider is to use bolts for the arms 25 and to screw these bolts into a tubular hub member 26. These bolts 25 extend radially outward from the hub member 26 and are preferably locked in the hub member 26 by one or two screws 27, Figs. 6 and 7, that are screwed axially into the hub 26 and jam against the inner end portions of the bolts 25.

Preferably a tubular bushing 28 is provided on each spider arm 25 and these bushings fit within transverse holes in the legs 21 and 22 and the cane and leg member 20. Preferably a washer 29 is provided at each end of each bushing, as shown in Fig. 5.

Figure 15:

Obviously changes in the form of construction of the spider member may be made. For instance Fig. 15 shows a spider member made of three bolts 30 having their heads 31 welded together. The outer ends of the bolts 30 shown in Fig. 15 are threaded for the reception of nuts 32 as illustrative of one means that may be used to prevent removal of legs or like members carried on the bolts 30.

Figure 16:
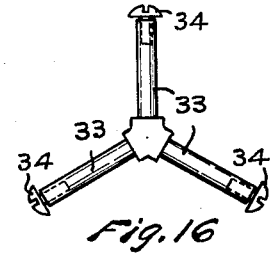
Figs. 15, 16 and 17 are detached plan views of three modified forms of spider members similar to the spider member shown in Figs. 5, 6 and 7.

Fig. 16 shows a spider member of one piece construction having three equidistantly spaced radial arms 33 whereon leg members may be mounted. The outer ends of the arms 33 shown in Fig. 16 are drilled and tapped for the reception of screws 34, as illustrative of one means by which legs or like members may be secured on the arms 33.

Figure 17:
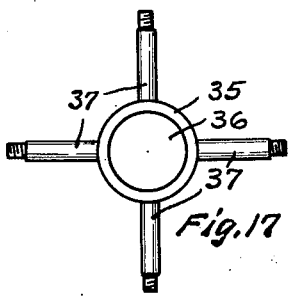

Fig. 17 shows a spider of modified construction having a central tubular hub portion 35 of substantial size provided with a central opening 36. The hub 35 has four equidistantly spaced radial arms 37 whereupon legs or like members may be pivotally mounted to provide a folding supporting structure having four legs. The opening 36 in the hub 35 can be used to support an upright staff or pedestal.

In each of the spiders herein disclosed the arms are rigidly supported relative to each other and radiate from a common center and the spider forms a strong and highly efficient means by which three or more leg members can be pivotally connected together for movement between a folded position and an extended or spread apart load supporting position. When three or more leg members are relatively crossed, as shown in Figs. 1, 2, 3 and 19, and are connected together by a spider of the type just described these leg members brace and reinforce each other and form a highly efficient supporting structure.

The use of three arms on the spider and three legs pivotally mounted on these arms is desirable because it provides a tripod structure that will have three points of contact with the surface on which it rests and for this reason will rest firmly on uneven surfaces and will not tend to teeter or tip. However it will be understood that three, four or more than four legs can be provided on a load supporting structure of this nature.

Figure 1:
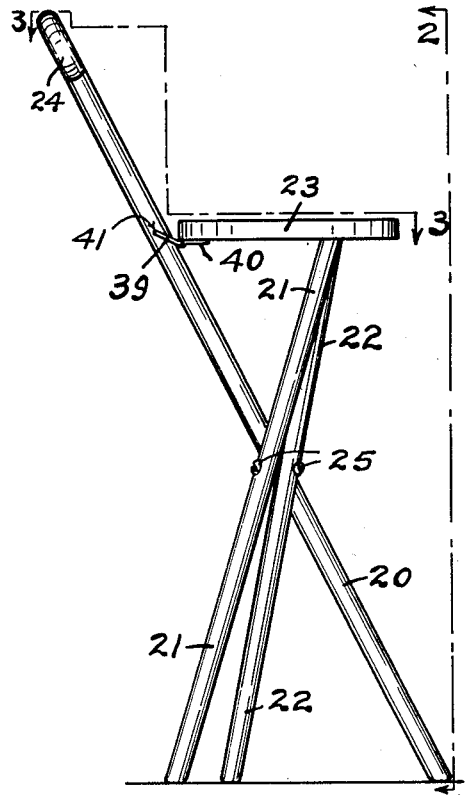
Figure 1 is a side elevation of a cane stool having supporting means constructed in accordance with this invention showing said cane stool in a position to be used as a stool.
Figure 2:
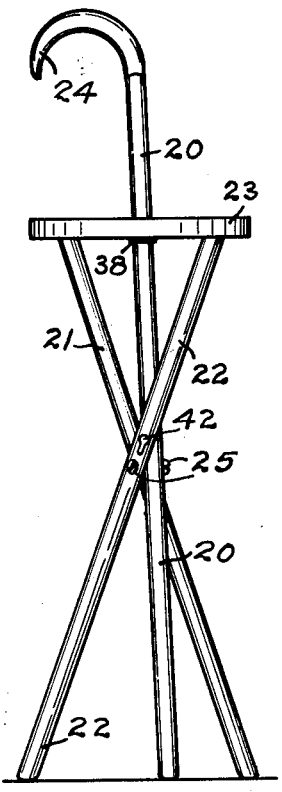
Fig. 2 is a front elevation looking in the direction of line 2—2 of Fig. 1.
Figure 4:
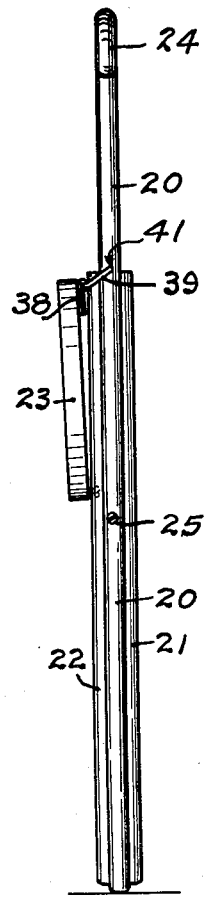
Fig. 4 is a side elevation of this cane stool, showing the same folded so that it may be used as a cane.
Figure 3:
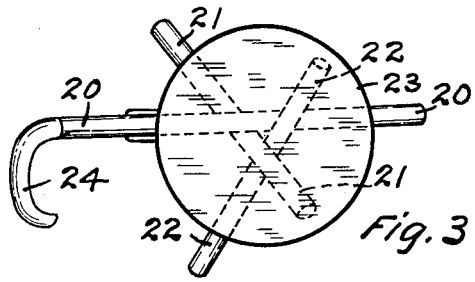
Fig. 3 is a plan view looking down on broken line 3—3 of Fig. 1.
Figure 8:
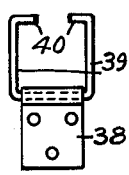
Fig. 8 is a detached plan view of hinge means used for connecting the seat of the stool with one of the support members.

Figs. 1, 4 and 8 show a preferred type of hinge means for pivotally connecting the seat member 23 with the combined leg and cane member 20. This hinge means comprises a hinge plate 38 pivotally connected with a U-shaped link 39 that has inturned ends 40. The hinge plate 38 is adapted to be secured to the seat 23. The inturned ends 40 of the U-shaped link 39 are adapted to fit into holes 41 in the cane member 20 and thus form a hinge connection having two pivot joints. This lets the back or hinged edge of the seat move away from the spider a short distance when the stool is being folded or unfolded and provides room for the upper ends of the leg members 21 and 22 to clear the back edge of the seat 23. If the seat 23 is hinged to the member 20 by an ordinary hinge and the portions of the legs 21 and 22 above the spider arms 25 are long enough to maintain the seat level when the structure is properly balanced then the upper ends of the leg members 21 and 22 will not clear the back edge of said seat member in folding and unfolding.

It is desirable to have the lower end of the member 20 extend below the ends of the leg members 21 and 22 when the device is folded and to be used as a cane. I have found that approximately a quarter inch overhang of member 20 is sufficient and that an overhang substantially in excess of one quarter of an inch will be detrimental to the balance of the stool.

Figure 9:
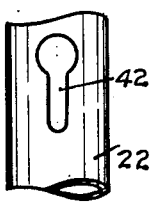
Fig. 9 is a detached fragmentary elevation of a portion of one of the leg members shown in Figures 1 to 5 showing a key hole shaped slot in said leg member.
Figure 10:
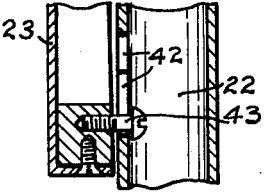
Fig. 10 is a sectional view through the leg member shown in Fig. 10, illustrating a portion of the seat of the stool connected with said leg member as it may be when the parts are folded.

One means for releasably fastening the seat 23 to a tubular metal leg, such as leg 22 of this cane stool, is shown in Figs. 9 and 10. This means comprises providing a key hole shaped slot 42 in the tubular metal leg member 22 and providing on the seat 23 a rigid screw 43 having a protruding head and neck portion adapted to be engaged within said key hole shaped slot 42. The larger end of the key hole shaped slot is uppermost so that when the screw 43 is engaged within said slot and the device is being used as a cane gravity will prevent disengagement of the screw 43 from the slot 42. The double pivot hinge shown in Fig. 8 makes possible the use of the releasable fastening means shown in Figs. 9 and 10 by permitting some movement of the seat 23 longitudinally of the cane 20 and legs 21 and 22.

Figure 11:
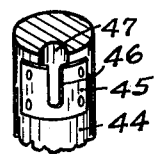
Fig. 11 is a detached perspective view of a fragment of a wood leg member showing thereon a clip that is arranged to receive the head portion of a screw similar to the one shown in Fig. 10.

In the event wooden legs 44, Fig. 11, are used instead of the tubular metal legs shown in Figs. 1 to 5, 9 and 10 then I preferably secure to one of the wooden legs 44 a clip 45 having a slot 46 therein to receive the shank of a screw similar to the screw 43 of Fig. 10. In this instance the leg 44 is cut away back of the slot 46 to form a recess 47 of suitable size and shape to receive the head of the screw.

Figure 12:
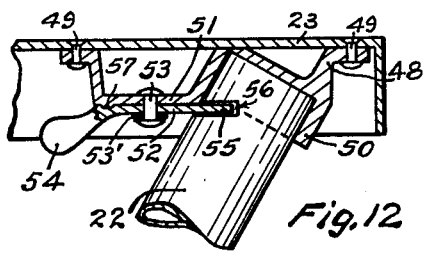
Fig. 12 is a fragmentary view partly in section and partly in elevation showing a means that may be used for releasably fastening the upper end portion of a leg member to the device it supports such as the seat of the stool shown in Figs. 1 to 5 inclusive.

One satisfactory means for fastening the upper end portion of the legs 21 and 22 to the under side of the metal seat 23 is shown in Fig. 12. This means comprises a bracket 48 secured to the seat 23 as by rivets 49. This bracket 48 has a socket 50 to receive the end of a leg such as leg 22. Also this bracket 48 is provided with a plate portion 51 whereon a locking member 52 is pivotally mounted by a rivet 53. The locking member 52 has a finger piece 54 at one end and has, at the other end a locking tongue 55 adapted to engage within a slot 56 in the leg member 22. Preferably detent means 57 of ball and socket type is provided to releasably hold the locking member 52 in locked position. When the locking member 52 is angularly moved far enough to move the locking tongue 55 clear of the slot 56 then the leg 22 can be folded.

A spring washer 53' may be used on rivet 53 to facilitate proper operation of the detent means 57.

Figure 13:
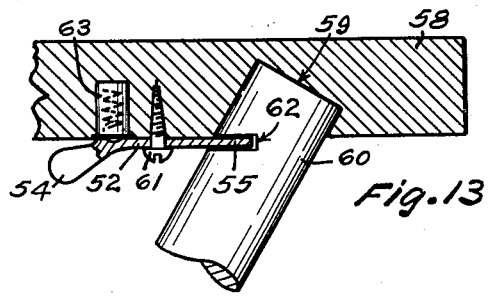
Figs. 13 and 14 are fragmentary sectional views of two modified forms of leg fastening devices of a type similar to that shown in Fig. 12.
Figure 14:
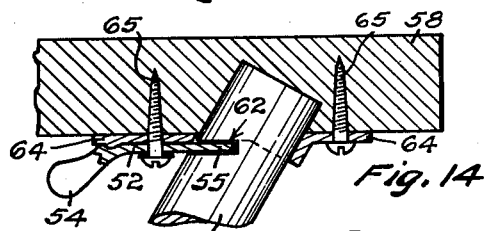

Figs. 13 and 14 show two adaptations of a locking means similar to that of Fig. 12 to wooden seat members 58 which may be used in place of the metal seat member 23 of Figs. 1 to 4 and 12. In the structure shown in Fig. 13 a recess 59 is provided in the bottom of the seat 58 for the reception of the upper end portion of a leg member 60 which may be of wood but which corresponds to one of the leg members 21 or 22 of Figs. 1 to 4. A locking member which may be identical with member 52, 54, 55 of Fig. 12 is pivotally secured directly to the seat 58 by a screw 61 and arranged to be moved so that its locking tongue 55 will engage within or be clear of a notch 62 in the leg 60. A spring detent member 63 of the type known as a "bullet catch" is embedded in the seat 58 to cooperate with the blocking member 52 and releasably hold said member 52 in a locked position.

In the structure shown in Fig. 14 the same locking member 52, 54, 55 is used in combination with a bracket 64. Screws 65 secure the bracket 64 to the seat 58 and one of these screws 65 extends through the locking member 52 and supports the same for pivotal movement. When the bracket 64 is used it provides a stronger construction and a better support for the leg 60 than when said bracket is omitted. Also when the bracket 64 is used the detent member 63 of Fig. 13 may be omitted.

Figure 18:
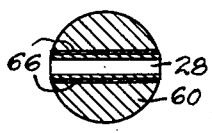
Fig. 18 is a cross sectional view showing a leg member with a bushing glued therein.
Figure 19:
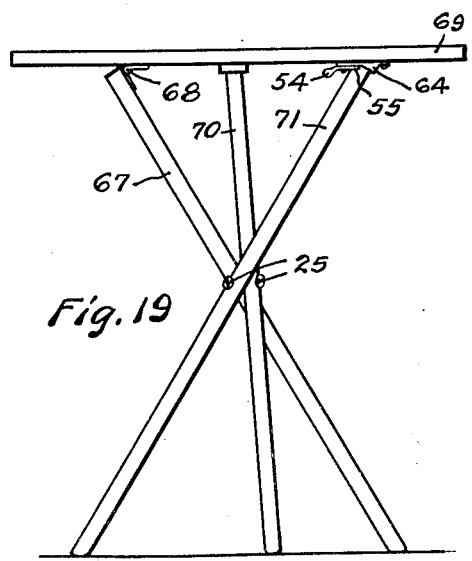
Fig. 19 is an elevation of a table provided with multiple leg support means constructed in accordance with this invention.

When wooden leg members, such as the leg 60 are used, I preferably glue the bushings 28 in these leg members as shown in Fig. 18 in which 66 indicates glue securing the bushing 28 to the leg member 60.

Fig. 19 shows a table 69 supported on a three legged support constructed in accordance with this invention. In a construction of this type one of the legs such as leg 67 is preferably pivotally connected, as by a hinge 68 to the under side of a table top 69. The other two legs 70 and 71 are preferably detachably connected with the table top. The mechanism shown in Fig. 14 may be used to connect one or both of the legs 70 or 71 to the table top. If one of the legs, such as leg 71, is provided with fastening means, such as the means shown in Fig. 13 or 14 it will ordinarily be sufficient to seat the other leg 70 in a socket in the bottom of the table. The structure in Fig. 19 will fold in a manner similar to the structure in Figs. 1 to 4.

Obviously a leg structure of the type shown in Fig. 19 may be used to support any deck member or load other than the table top shown in Fig. 19.

It will be understood that changes in this device may be made within the scope and spirit of the following claims.

I claim:

1. Tripod support means comprising a normally horizontal spider having three equidistantly spaced apart relatively rigid arms radiating from a common center and disposed in a common plane; three normally upwardly extending inclined legs pivotally mounted on the respective arms, the portions of all of said legs below said spider being of approximately equal length and the portions of two of the legs above the spider being of substantially equal length and being shorter than the corresponding portion of the other leg; a substantially rigid non-pliable seat member adapted to be supported by said legs; readily detachable leg connecting means adapted to connect the upper end portions of the two shorter legs with said seat; a hinge clip attached to the bottom of said seat member adjacent the edge portion thereof and adjacent to said longer leg; and a relatively short U shaped link having a closed end portion pivotally connected with said hinge clip and having an open end portion fitting over and pivotally connected with said longer leg, whereby a limited amount of movement of the seat member longitudinally of and toward and away from the longer leg is provided and whereby said seat member may be folded downwardly alongside of the shorter legs when the two shorter legs are folded parallel with the longer leg.

2. Folding tripod support means comprising a normally horizontal spider having three equidistantly spaced apart fixed arms radiating from a common center and disposed in a common plane; three normally upwardly extending inclined legs pivotally and foldably mounted on the respective arms, the portions of all of said legs below said spider being of approximately equal length and the portions of two of the legs above the spider being of approximately equal length and being substantially shorter than the corresponding portion of the other leg, one of said shorter legs having a longitudinally extending keyhole shaped slot therein adjacent said spider; a substantially rigid non-pliable seat member adapted to be supported by said legs; a catch member carried by said seat and extending from the lower side thereof and having a head portion for engagement within the keyhole shaped slot in said leg when the seat is folded; readily detachable leg connecting means adapted to connect the upper end portions of the two shorter legs with said seat; a hinge clip attached to the bottom of said seat adjacent the edge of the seat and adjacent the longer leg, and a relatively short U shaped link having a closed end portion pivotally connected with said hinge clip and having an open end portion fitting over and pivotally connected with said longer leg, whereby a limited amount of movement of the seat longitudinally of and toward and away from the longer leg is provided when the legs are folded and the seat is folded downwardly alongside of the legs so that said catch member may be engaged with and disengaged from said keyhole shaped slot in one of the shorter legs.

WILLIAM JOSEPH MacLELLAN.

REFERENCES CITED

The following references are of record in the file of this patent:

UNITED STATES PATENTS

| Number | Name | Date |
|---|---|---|
| 32,698 | Johnson | July 2, 1861 |
| 772,316 | Mock | Oct. 11, 1909 |
| 1,477,233 | Alexander | Dec. 11, 1923 |

FOREIGN PATENTS

| Number | Country | Date |
|---|---|---|
| 7,077 | Great Britain | of 1903 |
| 16,335 | Switzerland | Feb. 14, 1898 |
| 125,269 | Great Britain | Apr. 17, 1919 |
| 828,411 | France | Feb. 7, 1938 |